United States Patent
Itou et al.

(10) Patent No.: US 9,260,338 B2
(45) Date of Patent: Feb. 16, 2016

(54) POROUS GLASS BODY AND METHOD FOR PRODUCING GLASS PREFORM

(71) Applicant: SUMITOMO ELECTRIC INDUSTRIES, LTD., Osaka-shi, Osaka (JP)

(72) Inventors: Teruhiko Itou, Yokohama (JP); Tomohiro Ishihara, Yokohama (JP); Motonori Nakamura, Itami (JP); Yuugo Kubo, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/193,319

(22) Filed: Feb. 28, 2014

(65) Prior Publication Data

US 2015/0246841 A1    Sep. 3, 2015

(51) Int. Cl.
*H01L 23/08* (2006.01)
*C03B 37/014* (2006.01)

(52) U.S. Cl.
CPC .................................. *C03B 37/014* (2013.01)

(58) Field of Classification Search
None
See application file for complete search history.

(56) References Cited

U.S. PATENT DOCUMENTS

| 4,765,815 A * | 8/1988 | Danzuka et al. ................ 65/414 |
| 2003/0029202 A1* | 2/2003 | Ooishi et al. .................... 65/384 |

FOREIGN PATENT DOCUMENTS

| JP | H02/229726 A | 9/1990 |
| JP | 2004-345902 A | 12/2004 |
| JP | 2006-206356 A | 8/2006 |

OTHER PUBLICATIONS

Machione-generated English translation of JP 2006-206356, total pp. 8.*

* cited by examiner

*Primary Examiner* — Kimberly Rizkallah
*Assistant Examiner* — Bo Bin Jang
(74) *Attorney, Agent, or Firm* — Drinker Biddle & Reath LLP

(57) ABSTRACT

One embodiment provides a porous glass body which is obtained by depositing plural deposited layers of glass fine particles on a starting material in a layered manner by relatively reciprocating a burner for glass-fine-particle synthesis and the starting material. In the porous glass body, a porosity in a layer at the deposited layers falls within a range of 40% to 90%, and the porosity in the layer decreases from a central side toward an outer side in a radial direction thereof.

4 Claims, 4 Drawing Sheets

POROUS GLASS BODY AND METHOD FOR PRODUCING GLASS PREFORM

FIELD

The present invention relates to a porous glass body obtained by depositing glass fine particles and a method for producing a glass preform.

BACKGROUND

For example, JP-H02-229726-A discloses the method for producing an optical fiber preform in which a glass-fine-particle deposited body prepared by the VAD method is impregnated with a solution composed of one or more of ions of elements selected from the group consisting of B, Ge, P, Sb, Al and Ti or oxide ions of the elements and a solvent and dried, and subsequently heating at high temperature is performed to obtain a transparent glass preform. According to JP-H02-229726-A, the porosity of the glass-fine-particle deposited body desirably falls within the range of 54.5% to 86.4%. There is also described that, in the case where the porosity is smaller than 54.5%, the solution is not absorbed since the deposited body is hard, and that, in the case where the porosity is larger than 86.4%, the deposited body tends to be cracked at the time of the impregnation with the liquid since the deposited body is soft.

JP-2004-345902-A discloses the method for producing an optical fiber preform in which a glass-fine-particle deposited body prepared by the VAD method or the OVD method is heated under a fluorine compound-containing atmosphere to add fluorine thereto and subsequently further heated at high temperature under a fluorine compound-containing atmosphere or an inert gas atmosphere to obtain a transparent glass preform. According to JP-2004-345902-A, it is effective to control the porosity at the start of heating under the fluorine compound-containing atmosphere to 70% or more, in order to homogenize the fluorine content in the finally obtained transparent glass preform. There is also described that, when the porosity is less than 70%, fluorine cannot be sufficiently diffused into the glass-fine-particle deposited body and a sufficient fluorine content is not obtained or an extremely long period of time is required for achieving homogeneous fluorine concentration.

A porous glass body produced by the OVD method or the MMD method in which a target on which glass fine particles are deposited and a burner is relatively reciprocated has a multi-layer structure in which plural layers are stacked. In the case where porosity is too low in a part or all part of the porous glass body having the multi-layer structure, voids between the glass fine particles become very small. Therefore, in the heating and sintering step in which the porous glass body is heated to form a transparent glass preform, the diffusion coefficient of the atmospheric gas such as helium (He) decreases and gas permeability lowers in the porous glass body, so that shrinkage and disappearance of closed pores generated by solidification (neck formation) of the glass fine particles do not sufficiently proceed and residual air bubbles are prone to be generated. On the other hand, in the case where the porosity is too high in a part or all part of the porous glass body, the number of the glass fine particles per unit volume is small and much space is present in the high porosity part, so that the bonding force between the glass fine particles becomes weak and there is a possibility that the deposited body is cracked in the middle of the deposition step of the glass fine particles.

Moreover, when the porosity is greatly varied at a boundary of individual layers, not only the residual air bubbles are prone to be generated at a part having low porosity but also the composition becomes heterogeneous in a radial direction, so that a decrease in quality is invited.

SUMMARY

The invention provides following Aspects 1 to 5.
1. A porous glass body obtained by depositing plural deposited layers of glass fine particles on a starting material in a layered manner by relatively reciprocating a burner for glass-fine-particle synthesis and the starting material,
    wherein a porosity in a layer at the deposited layers falls within a range of 40% to 90%, and the porosity in the layer decreases from a central side toward an outer side in a radial direction thereof.
2. The porous glass body of Aspect 1,
    wherein a decrease rate of the porosity in the layer is 1.00%/μm or less.
3. The porous glass body of Aspect 2,
    wherein the porosity in the layer falls within the range of 45% to 85%, and the decrease rate thereof is 0.50%/μm or less.
4. The porous glass body of Aspect 2,
    wherein the porosity in the layer falls within the range of 50% to 80%, and the decrease rate thereof is 0.40%/μm or less.
5. A method for producing a glass preform, including:
    reciprocating a burner for glass-fine-particle synthesis and a starting material to thereby deposit plural deposited layers composed of glass fine particles on the starting material in a layered manner and to form a porous glass body; and
    heating the formed porous glass body to thereby make it transparent and to obtain a transparent glass preform,
    wherein a porosity in a layer at the deposited layers is controlled to fall within a range of 40% to 90% and to decrease from a central side toward an outer side in a radial direction thereof, by regulating flow rates of a starting gas and a combustible gas.

According to the above-mentioned porous glass body, porosity in a layer of the deposited layers falls within the range of 40% to 90% and decreases from the central side toward the outer side in a radial direction. Thereby, it is possible to form a high quality porous glass body in which variation in the porosity is suppressed as far as possible and it is also possible to suppress, until a low degree, cracking of the deposited body in a step of depositing glass fine particles on a starting material and generation probability of residual air bubbles in a heating and sintering step of obtaining a transparent glass preform by heating.

DETAILED DESCRIPTION

Figure 1:
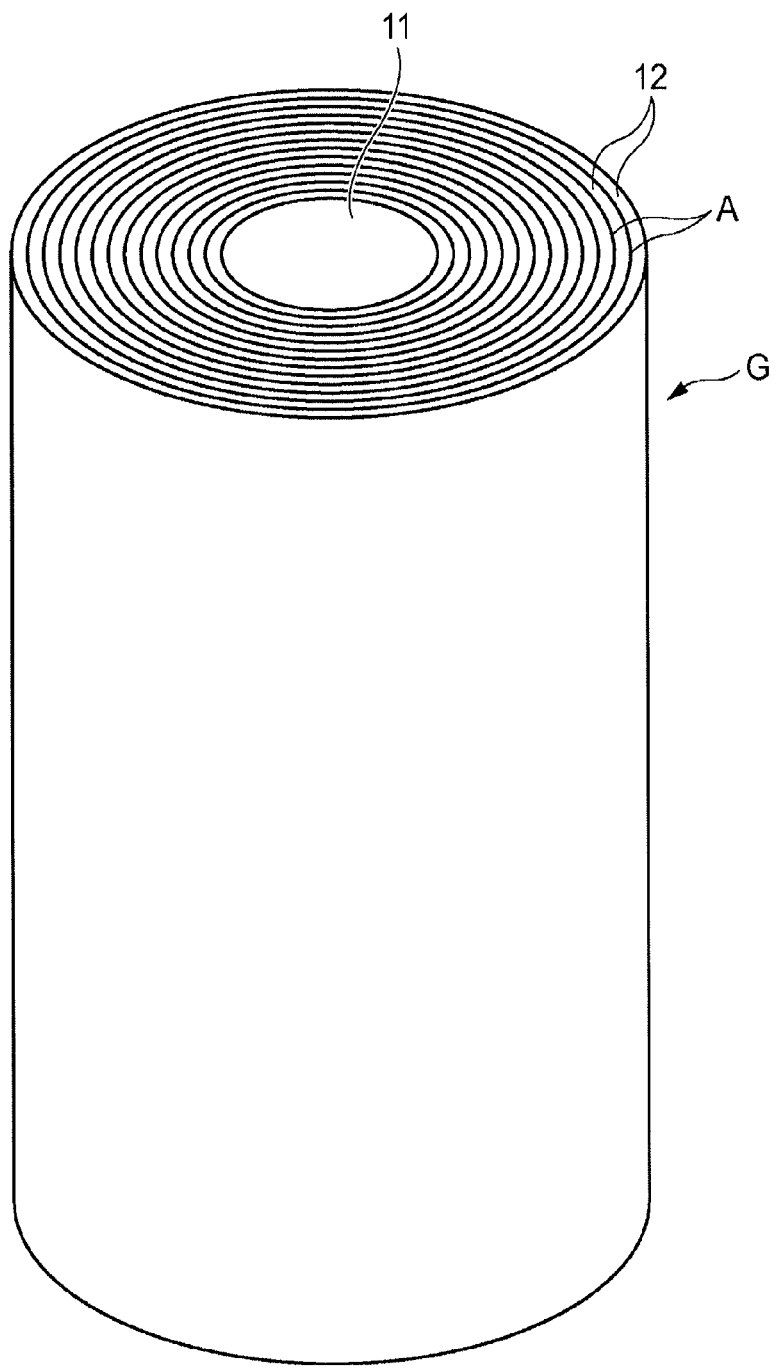
FIG. 1 is a perspective view of the porous glass body according to the present embodiment, which is in a horizontally cut state.
Figure 2:
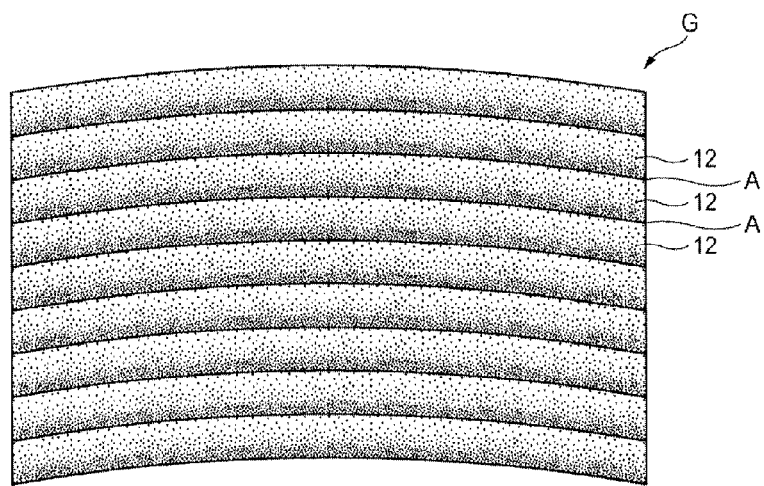
FIG. 2 is a figure showing a part of a cross-section of the porous glass body.

An example of the embodiment of the porous glass body will be described with reference to Drawings. As shown in FIG. 1 and FIG. 2, a porous glass body G is produced by the OVD method (outside vapor deposition method) or the MMD method (multi-burner multi-layer deposition method) and has a multi-layer structure in which plural deposited layers 12 of glass fine particles are stacked in a layer form around a glass rod (starting material) 11 that is a target. With regard to the each deposited layer 12 of the porous glass body G, the position at which brightness is remarkably changed in a radial direction in the transverse section can be observed as a boundary A of the deposited layer 12. The layer 12 has a thickness ranging from 30 μm to 250 μm.

In each deposited layer 12 constituting the porous glass body G, porosity K at all sites in a longitudinal direction and in a radial direction at the inside thereof falls within the range of 40% to 90%. Furthermore, in each deposited layer 12 of the porous glass body G, the porosity K decreases from the central side to the outer side in a radial direction. The decrease rate of the porosity K from the central side toward the outer side in a radial direction in the deposited layer 12 is controlled to 1.00%/μm or less.

The porosity K in the deposited layer 12 of the porous glass body G can be determined by processing an image taken on a scanning electron microscope (SEM).

Figure 3:
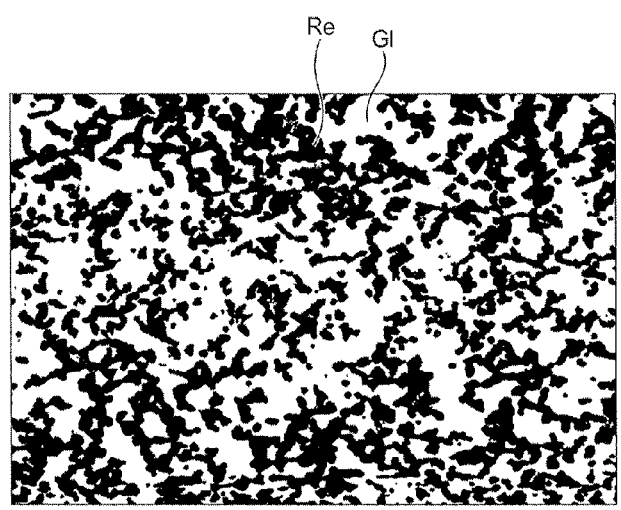
FIG. 3 is a figure showing an image of a cross-section of a glass piece taken out of the porous glass body, which is measured on a scanning electron microscope.

Specifically, a site containing a deposited layer 12 at which the porosity K is to be determined at the porous glass body G is first sampled and is embedded in an epoxy resin and the resin is cured. Then, the porous glass part is polished with a cross-section polisher (Ar ion beam processing apparatus). Optionally, conductive coating of carbon, Au, Pt, or the like may be applied. After thus polished, the part is photographed on a scanning electron microscope (SEM). Consequently, as shown in FIG. 3, an image having a glass part GI and a resin part Re is taken. In an arbitrary range (e.g., 16×16 μm) in the image thus obtained, binarization is performed with assigning a part at which the glass fine particles are present to 1 and a part at which the particles are absent to 0 depending on the intensity of brightness, and the ratio of the area assignable to the part of 0 is calculated as the porosity K.

Figure 4:
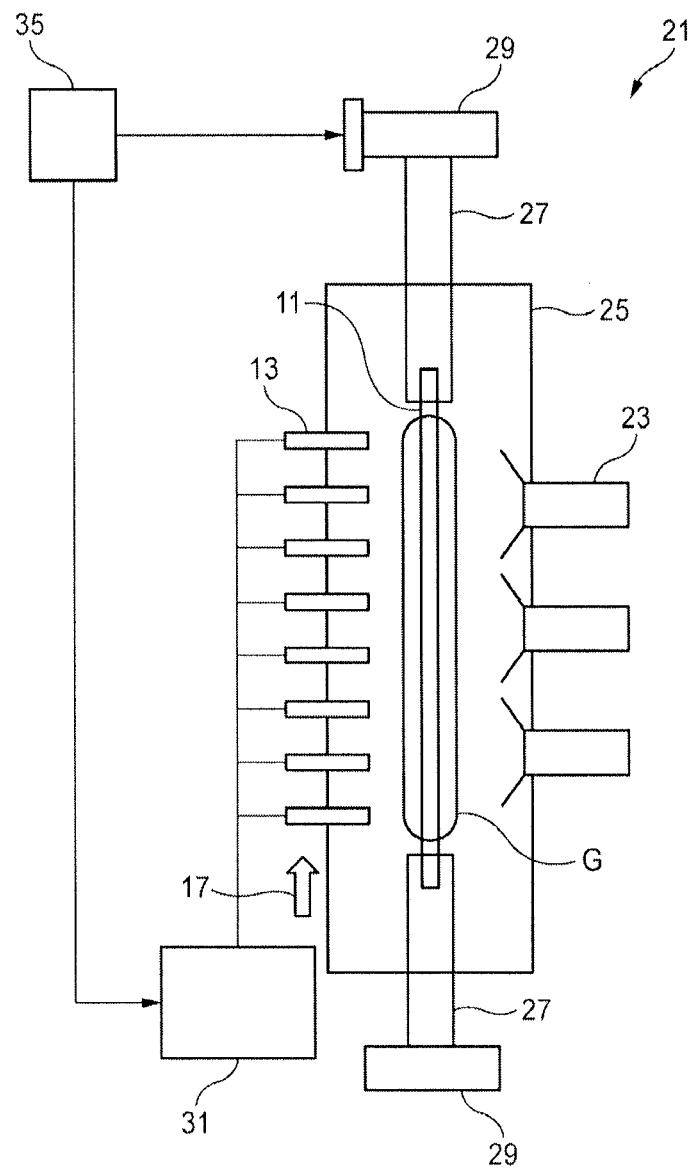
FIG. 4 is a schematic block diagram of a producing apparatus of the porous glass body.

The following will describe the case where the above porous glass body G is produced by the MMD method. As shown in FIG. 4, a producing apparatus 21 is an apparatus for producing a porous glass body by the MMD method and is provided with a reaction vessel 25. The reaction vessel 25 has a plural pieces (8 pieces in this example) of burners 13 for glass-fine-particle synthesis and a discharge pipe 23 for discharging the gas in the reaction vessel 25.

The reaction vessel 25 is provided with traverse devices 29 each having a supporting rod 27 at an upper part and a lower part of the vessel and the upper end and the lower end of a glass rod 11 are supported with respective supporting rods 27 of these traverse devices 29. The traverse devices 29 reciprocate the glass rod 11 supported with the supporting rods 27 while rotating the rod.

Plural the burners 13 are disposed in a line along the axial direction of the glass rod 11. A gas supplying device 31 is connected to the burners 13 and the gas supplying device 31 supplies a raw material gas ($SiCl_4$ or the like), a combustible gas ($H_2$), a combustion-assisting gas ($O_2$), an inert gas ($N_2$) and the like to the burners 13. The burners 13 eject the raw material gas and a flame gas toward the glass rod 11. Thereby, glass fine particles formed by flame hydrolysis are deposited on the glass rod 11 which is vertically reciprocated relatively to the burners 13 while being rotated around an axis. As above, in the reaction vessel 25, there is formed a cylindrical porous glass body G in which the glass fine particles are deposited on the glass rod 11. A predetermined amount of a gas is discharged from a discharge pipe 23 and also the glass fine particles which are floating in the reaction vessel 25 and have not been deposited on the glass rod 11 are discharged.

The producing apparatus 21 is provided with a control device 35 having CPU. The control device 35 is connected to the traverse devices 29 and the gas supplying device 31, and outputs control signals to the traverse devices 29 and the gas supplying device 31. Thereby, the vertical traverse rate of the glass rod 11 by the traverse devices 29 and the supplying amounts of gases to the burners 13 by the gas supplying device 31 are controlled.

For producing the porous glass body G using the above producing apparatus 21, the glass rod 11 is disposed in the reaction vessel 25 by supporting the glass rod 11 with the supporting rods 27. Then, the glass rod 11 is vertically reciprocated by the traverse devices 29 while rotating the rod to deposit the glass fine particles in sequence around the glass rod 11, the particles being formed by the burners 13 disposed at almost equal intervals.

At the time when the glass fine particles are deposited on the glass rod 11, the returning position of the reciprocation of the glass rod 11 is displaced by a constant value at a time by means of the traverse devices 29, and after the position is shifted by almost the disposition interval of the burners 13, the displacement direction of the returning position is reversed. The reason why the returning position is displaced in such a manner is that the deposition amount at the returning position increases and variation in outer diameter occurs when the glass rod 11 is returned at the same position.

As above, the porous glass body G having a multi-layer structure in which plural the deposited layers 12 of the glass fine particles are stacked around the glass rod 11 is formed by depositing the glass fine particles on the glass rod 11. When the porous glass body G is used as an optical fiber preform, the porous glass body G is subsequently subjected to a clarification treatment by heating and sintering.

At the porous glass body G, when the porosity K is lower than 40% at a part or all part thereof, voids between the glass fine particles become very little in the low porosity part. Therefore, in the heating and sintering step in which the porous glass body G is heated to form a transparent glass preform, the diffusion coefficient of the atmospheric gas such as helium (He) decreases and gas permeability lowers in the porous glass body G, so that shrinkage and disappearance of closed pores generated by neck formation of the glass fine particles do not sufficiently proceed and residual air bubbles are prone to be generated. On the other hand, in the case where the porosity K is higher than 90% in a part or all part of the porous glass body G, the number of the glass fine particles per unit volume is small and much space is present in the high porosity part, so that the bonding force between the glass fine particles becomes weak and there is a possibility that the deposited body is cracked in the middle of the deposition step of the glass fine particles.

In a porous glass body G having a multi-layer structure, there is a tendency that the porosity K in a part of the deposited layers 12 or all the deposited layers 12 changes from the central side toward the outer side in a radial direction. At this time, in the case where the porosity increases from the central side toward the outer side, hard glass fine particles are deposited on a soft deposited layer at the boundary A of individual deposited layers 12, so that the cracking probability of the deposited body increases. On the other hand, in the case where the porosity decreases from the central side toward the outer side, soft glass fine particles are deposited on a hard deposited layer at the boundary A of individual deposited layers 12, so that the cracking of the deposited body is difficult to occur. However, even in the case where the porosity K in the deposited layer 12 decreases from the central side toward the outer side, the porosity K greatly changes at the boundary A of the individual deposited layers 12 when the decrease rate of the porosity K in the deposited layer 12 is large, so that not only the residual air bubbles are prone to be generated at the part where the porosity K is low but also the composition becomes heterogeneous in a radial direction, and hence a decrease in quality is invited. Therefore, the change rate of the porosity K in the deposited layer 12 is desirably as low as possible.

At the porous glass body G according to the present embodiment, the porosity K at all sites in a longitudinal direction and in a radial direction at the inside of the individual deposited layers 12 is controlled within the range of 40% to 90% and decreases from the central side toward the outer side in a radial direction.

Thereby, the porous glass body G according to the present embodiment can be high quality one in which variation in the porosity K is suppressed as far as possible, and there can be suppressed, until a low degree, the cracking of the deposited body in the step of depositing the glass fine particles on the glass rod 11 and the generation probability of the residual air bubbles in the heating and sintering step of obtaining a transparent glass preform by heating.

From the above, in the case where the porosity K of the porous glass body G is out of the range of 40% to 90% at a part or the whole thereof, since the cracking of the deposited body and the generation probability of the residual air bubbles steeply increase, the production of defective products can be avoided beforehand by canceling the subsequent heating and sintering step and the like, and production costs can be lowered with avoiding waste.

In the above embodiment, the porosity K of all the deposited layers 12 at the porous glass body G is controlled within the range of 40% to 90% and is decreased from the central side toward the outer side, but the porosity K of predetermined deposited layer(s) 12 may be controlled within the range of 40% to 90% and be decreased from the central side toward the outer side.

When the decrease rate of the porosity K from the central side toward the outer side in a radial direction in the deposited layer 12 is controlled to 1.00%/μm or less, there can be suppressed, to a further low extent, the cracking of the deposited body in the step of depositing the glass fine particles on the glass rod 11 and the generation probability of the residual air bubbles in the heating and sintering step of heating the porous glass body G to obtain a transparent glass preform.

The porosity K of the porous glass body G may fall within the range of 45% to 85%, and may decrease at a rate of 0.50%/μm or less in a radial direction from the central side toward the outer side in the deposited layer 12. Further, the porosity K may fall within the range of 50% to 80%, and may decrease at a rate of 0.40%/μm or less in a radial direction from the central side toward the outer side in the deposited layer 12. According to such porous glass body G, the cracking of the deposited body and the generation probability of the residual air bubbles can be further lowered.

In the above embodiment, there is exemplified the case where the porous glass body G is produced by the MMD method, but the porous glass body G may be produced by not only the MMD method but also the OVD method as long as it is a producing method in which glass fine particles are deposited as plural layers to form the porous glass body G.

EXAMPLES

Figure 5:
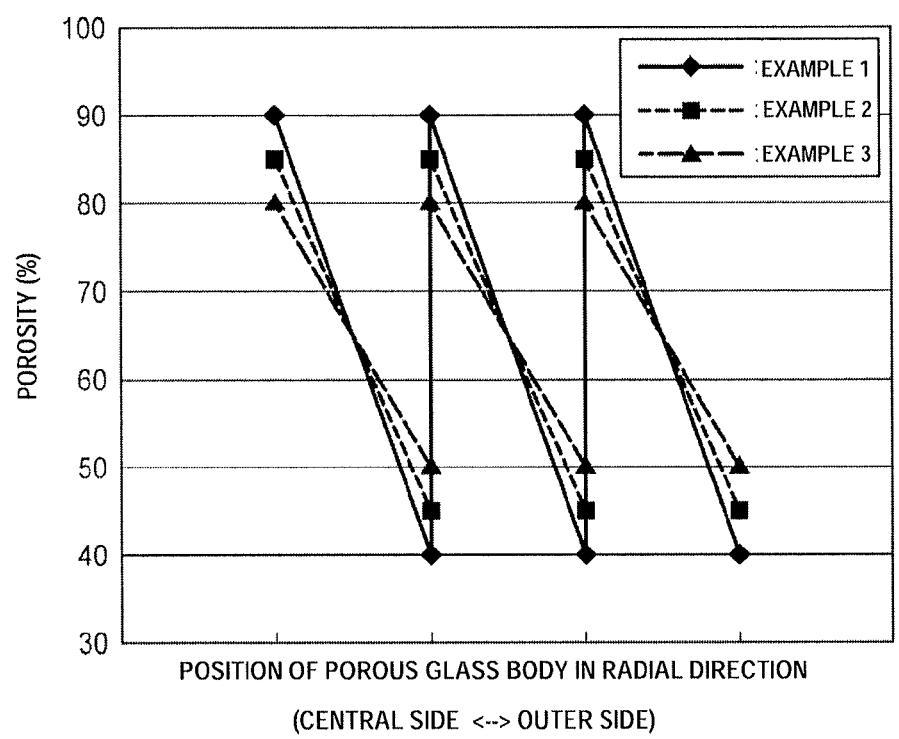
FIG. 5 is a figure showing porosity distribution in Examples 1 to 3.

Glass fine particles are deposited under various conditions using the producing apparatus 21 shown in FIG. 4 to produce the porous glass bodies G of Examples 1 to 3 and Comparative Examples 1 to 3, and each porous glass body G is evaluated. Table 1 shows the state and evaluation results of each porous glass body G. FIG. 5 shows porosity distribution in Examples 1 to 3.

TABLE 1

|  | Range of porosity (%) | Gradient of porosity in layer (%/μm) | Cracking probability (%) | Average number of air bubbles | Thickness of one layer (μm) |
| --- | --- | --- | --- | --- | --- |
| Example 1 | 40 to 90 | 1.00 | 5 | 5 | 50 |
| Example 2 | 45 to 85 | 0.50 | 1 | 2 | 80 |
| Example 3 | 50 to 80 | 0.40 | 0 | 0 | 75 |
| Comparative Example 1 | 27 to 47 | 1.05 | 0 | 35 | 19 |
| Comparative Example 2 | 70 to 95 | 1.14 | 20 | 25 | 22 |
| Comparative Example 3 | 30 to 65 | −0.58 | 35 | 30 | 60 |

As a target at the time of producing the porous glass body G, a glass rod 11 composed of pure quartz glass having a diameter of 30 mm and a length of 1,600 mm is used. To the burners 13, $SiCl_4$ as a raw material gas, $H_2$ and $O_2$ as flame forming gases, and $N_2$ as a sealing gas are supplied. The burners 13 are disposed at an interval of 200 mm and the relative movement between the burners 13 and the glass rod 11 is achieved by reciprocating the glass rod 11 vertically. The deposition of the glass fine particles is performed with controlling the one-time moving distance toward one direction to the interval of the burners 13 by repeating the operations of shifting the returning position by 20 mm at a time, shifting the returning position to the opposite direction when the returning position has been displaced by 200 mm, and shifting the returning position to the opposite direction when the returning position has been returned to the initial position.

Example 1

A porous glass body G, in which the porosity K in the deposited layer 12 is from 40% to 90% (see FIG. 5) and the porosity K decreases from the central side toward the outer side in a radial direction, is prepared by adjusting the flow rate of $SiCl_4$ as a raw material gas and the flow rate of $H_2$ as a flame forming gas. The thickness of one layer is 50 μm and the decrease rate of the porosity K in a layer of the deposited layers 12 at the porous glass body G is as follows.

Rate of decrease in porosity $K=1(\%/\mu m)$

For the porous glass body G to be produced, when the cracking probability of the deposited body and the average number of air bubbles generated at the time of forming a transparent glass preform are determined, the cracking probability of the deposited body is 5% and the average number of air bubbles is 5.

Example 2

A porous glass body G, in which the porosity K in the deposited layer 12 is from 45% to 85% (see FIG. 5) and the porosity K decreases from the central side toward the outer side in a radial direction, is prepared by adjusting the flow rate of $SiCl_4$ as a raw material gas and the flow rate of $H_2$ as a flame forming gas. The thickness of one layer is 80 μm and the decrease rate of the porosity K in a layer of the deposited layers 12 at the porous glass body G is as follows.

Rate of decrease in porosity $K=0.5(\%/\mu m)$

For the porous glass body G to be produced, when the cracking probability of the deposited body and the average number of air bubbles generated at the time of forming a transparent glass preform are determined, the cracking probability of the deposited body is 1% and the average number of air bubbles is 2. In comparison to Example 1, it can be confirmed that both of the cracking probability of the deposited body and the average number of air bubbles are reduced.

Example 3

A porous glass body G, in which the porosity K in the deposited layer 12 is from 50% to 80% (see FIG. 5) and the porosity K decreases from the central side toward the outer side in a radial direction, is prepared by adjusting the flow rate of $SiCl_4$ as a raw material gas and the flow rate of $H_2$ as a flame forming gas. The thickness of one layer is 75 μm and the decrease rate of the porosity K in a layer of the deposited layers 12 at the porous glass body G is as follows.

Rate of decrease in porosity $K=0.4(\%/\mu m)$

For the porous glass body G to be produced, when the cracking probability of the deposited body and the average number of air bubbles generated at the time of forming a transparent glass preform are determined, the cracking probability of the deposited body is 0% and the average number of air bubbles is 0. Thus, it can be confirmed that the cracking probability of the deposited body in the deposition step of the glass fine particles and the generation probability of air bubbles in the heating and sintering step of forming the transparent glass preform by heating are lowered as the variance in the porosity K in a layer of the deposited layers 12 at the porous glass body G becomes little and the decrease rate becomes small. In Example 3 in which the decrease rate of the porosity K in one layer of the deposited layers 12 is smallest, it is understood that the change in the porosity K at the boundary A between individual deposited layers 12 becomes small, the remaining of air bubbles at a part having low porosity K is suppressed, and a transparent glass preform having a homogeneous composition in a radial direction is obtained, as compared to Examples 1 and 2.

The cracking probability of the deposited body in the deposition step of the glass fine particles and the generation probability of air bubbles in the heating and sintering step of forming the transparent glass preform by heating can be reduced as the decrease rate of the porosity K decreases but the decrease rate of about 0.03%/μm is actually generated even when the flow rate of $SiCl_4$ as the raw material gas and the flow rate of $H_2$ as the flame forming gas are adjusted.

Comparative Example 1

A porous glass body G, in which the porosity K in the deposited layer 12 is from 27% to 47% and the porosity K decreases from the central side toward the outer side in a radial direction, is prepared by adjusting the flow rate of $SiCl_4$ as a raw material gas and the flow rate of $H_2$ as a flame forming gas. The thickness of one layer is about 19 μm and the decrease rate of the porosity K in a layer of the deposited layers 12 at the porous glass body G is as follows.

Rate of decrease in porosity $K=1.05(\%/\mu m)$

For the porous glass body G to be produced, when the cracking probability of the deposited body and the average number of air bubbles generated at the time of forming a transparent glass preform are determined, the cracking probability of the deposited body is 0% and the average number of air bubbles is 35. In Comparative Example 1, in the low porosity part of the porous glass body G containing a part at which the porosity K is lower than 40%, voids between the glass fine particles becomes very little. Therefore, it is considered that, in the heating and sintering step of producing the transparent glass preform by heating, the diffusion of the atmospheric gas such as helium (He) that remains in the glass fine particle deposited body does not sufficiently proceed, shrinkage and disappearance of closed pores in the glass are not sufficiently achieved, and residual air bubbles are generated in large quantities.

Comparative Example 2

A porous glass body G, in which the porosity K in the deposited layer 12 is from 70% to 95% and the porosity K decreases from the central side toward the outer side in a radial direction, is prepared by adjusting the flow rate of $SiCl_4$ as a raw material gas and the flow rate of $H_2$ as a flame forming gas. The thickness of one layer is about 22 μm and the decrease rate of the porosity K in a layer of the deposited layers 12 at the porous glass body G is as follows.

Rate of decrease in porosity $K=1.14(\%/\mu m)$

For the porous glass body G to be produced, when the cracking probability of the deposited body and the average number of air bubbles generated at the time of forming a transparent glass preform are determined, the cracking probability of the deposited body is 20% and the average number of air bubbles is 25. In Comparative Example 2, in the high porosity part of the porous glass body G containing a part at which the porosity K is higher than 90%, since the number of the glass fine particles per unit volume is small and much space is present, it is considered that the bonding force between the glass fine particles becomes weak and the cracking of the deposited body in the middle of the deposition step of the glass fine particles occurs. Residual air bubbles after the heating and sintering step of producing the transparent glass preform by heating are generated in large quantities.

Comparative Example 3

A porous glass body G, in which the porosity K in the deposited layer 12 is from 30% to 65% and the porosity K decreases from the central side toward the outer side in a radial direction, is prepared by adjusting the flow rate of $SiCl_4$ as a raw material gas and the flow rate of $H_2$ as a flame forming gas. The thickness of one layer is about 60 μm and the decrease rate of the porosity K in a layer of the deposited layers 12 at the porous glass body G is as follows.

Rate of decrease in porosity $K=-0.58(\%/\mu m)$

For the porous glass body G to be produced, when the cracking probability of the deposited body and the average number of air bubbles generated at the time of forming a transparent glass preform are determined, the cracking probability of the deposited body is 35% and the average number of air bubbles is 30. In Comparative Example 3, the porosity increases from the central side toward the outer side in a radial direction in the layer, a hard glass-fine-particle deposited body is deposited on a soft glass-fine-particle deposited body at an interface between layers, and hence the cracking probability of the deposited body increases. Furthermore, in the low porosity part of the porous glass body G containing a part at which the porosity K is lower than 40%, voids between the glass fine particles becomes very little. Therefore, the diffusion of the atmospheric gas such as helium (He) that remains in the glass-fine-particle deposited body does not sufficiently proceed, shrinkage and disappearance of closed pores in the glass are not sufficiently achieved, and residual air bubbles are generated in large quantities.

While the specific embodiments have been described, it will be apparent to one skilled in the art that various changes and modifications can be made therein without departing from the spirit and scope the invention.

The invention claimed is:

1. A porous glass body obtained by depositing plural deposited layers of glass fine particles on a starting material in a layered manner by relatively reciprocating a burner for glass-fine-particle synthesis and the starting material,
    wherein a porosity in a layer at the deposited layers falls within a range of 40% to 90%, and the porosity in the layer decreases from a central side toward an outer side in a radial direction thereof, and
    wherein a decrease rate of the porosity in the layer is 1.00%/μm or less.

2. The porous glass body of claim 1,
    wherein the porosity in the layer falls within the range of 45% to 85%, and the decrease rate thereof is 0.50%/μm or less.

3. The porous glass body of claim 1,
    wherein the porosity in the layer falls within the range of 50% to 80%, and the decrease rate thereof is 0.40%/μm or less.

4. A method for producing a glass preform, including:
    reciprocating a burner for glass-fine-particle synthesis and a starting material to thereby deposit plural deposited layers composed of glass fine particles on the starting material in a layered manner and to form a porous glass body; and
    heating the formed porous glass body to thereby make it transparent and to obtain a transparent glass preform,
    wherein a porosity in a layer at the deposited layers is controlled to fall within a range of 40% to 90% and to decrease from a central side toward an outer side in a radial direction thereof, by regulating flow rates of a starting gas and a combustible gas, and
    wherein a decrease rate of the porosity in the layer is 1.00%/μm or less.

* * * * *